US012586707B2

(12) United States Patent
Sugi et al.

(10) Patent No.: US 12,586,707 B2
(45) Date of Patent: Mar. 24, 2026

(54) MULTILAYER RESIN SUBSTRATE AND METHOD OF MANUFACTURING MULTILAYER RESIN SUBSTRATE

(71) Applicant: Murata Manufacturing Co., Ltd., Nagaokakyo (JP)

(72) Inventors: Rintaro Sugi, Nagaokakyo (JP); Keisuke Araki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 973 days.

(21) Appl. No.: 17/569,548

(22) Filed: Jan. 6, 2022

(65) Prior Publication Data

US 2022/0130592 A1 Apr. 28, 2022

Related U.S. Application Data

(63) Continuation of application No. PCT/JP2020/027689, filed on Jul. 16, 2020.

(30) Foreign Application Priority Data

Jul. 19, 2019 (JP) ................................ 2019-133246

(51) Int. Cl.
*H01F 27/28* (2006.01)
*H01F 5/00* (2006.01)
*H01F 41/04* (2006.01)

(52) U.S. Cl.
CPC ......... *H01F 27/2804* (2013.01); *H01F 5/003* (2013.01); *H01F 41/041* (2013.01); *H01F 2027/2809* (2013.01)

(58) Field of Classification Search
CPC ......... H01F 27/2804; H01F 2027/2809; H01F 5/003; H01F 17/0013; H01F 17/0006
(Continued)

(56) References Cited

U.S. PATENT DOCUMENTS 8,188,828 B2 * 5/2012 Noma ................ H01F 17/0013 336/200
2014/0110821 A1 * 4/2014 Barry ................. H01L 23/5227 257/E29.325
(Continued)

FOREIGN PATENT DOCUMENTS

JP 02110907 A * 4/1990
JP 2004135455 A * 4/2004 ....... G06K 19/07796
(Continued)

OTHER PUBLICATIONS

Official Communication issued in International Patent Application No. PCT/JP2020/027689 mailed on Sep. 24, 2020.

*Primary Examiner* — Tszfung J Chan
(74) *Attorney, Agent, or Firm* — Keating & Bennett, LLP

(57) ABSTRACT

A multilayer resin substrate includes a stacked body and a coil including coil conductor patterns. A first coil conductor pattern includes a first non-overlapping portion not overlapping with a second coil conductor pattern, when viewed in a Z-axis direction. A second coil conductor pattern includes a second non-overlapping portion not overlapping with the first coil conductor pattern, when viewed in the Z-axis direction. The first non-overlapping portion protrudes more to an outer peripheral side in a radial direction than the second coil conductor pattern, and the second non-overlapping portion protrudes to an inner peripheral side in the radial direction.

10 Claims, 7 Drawing Sheets

(58) Field of Classification Search
USPC .................................................. 336/200, 232
See application file for complete search history.

(56) References Cited

U.S. PATENT DOCUMENTS

| | | | | |
|---|---|---|---|---|
| 2016/0012963 | A1* | 1/2016 | Yosui .................. | H01F 27/2804 174/260 |
| 2016/0027578 | A1 | 1/2016 | Nishino et al. | |
| 2016/0049237 | A1* | 2/2016 | Yosui .................. | H01F 27/2804 336/200 |
| 2019/0341180 | A1 | 11/2019 | Ito | |

FOREIGN PATENT DOCUMENTS

| | | | | | |
|---|---|---|---|---|---|
| JP | 2008118059 | A | * | 5/2008 | |
| JP | 2012070243 | A | * | 4/2012 | ............. H05K 1/165 |
| JP | 2015-050422 | A | | 3/2015 | |
| WO | 2015/005161 | A1 | | 1/2015 | |
| WO | 2015/079941 | A1 | | 6/2015 | |
| WO | WO-2017080554 | A1 | * | 5/2017 | ......... H01F 27/2804 |
| WO | WO-2017159437 | A1 | * | 9/2017 | ............. H01F 17/00 |
| WO | 2018/174133 | A1 | | 9/2018 | |

* cited by examiner

MULTILAYER RESIN SUBSTRATE AND METHOD OF MANUFACTURING MULTILAYER RESIN SUBSTRATE

CROSS REFERENCE TO RELATED APPLICATIONS

This application claims the benefit of priority to Japanese Patent Application No. 2019-133246 filed on Jul. 19, 2019 and is a Continuation Application of PCT Application No. PCT/JP2020/027689 filed on Jul. 16, 2020. The entire contents of each application are hereby incorporated herein by reference.

BACKGROUND OF THE INVENTION

1. Field of the Invention

The present invention relates to a multilayer resin substrate in which a plurality of resin layers each include a coil conductor pattern, and relates to a method of manufacturing such a multilayer resin substrate.

2. Description of the Related Art

Conventionally, a multilayer resin substrate including a stacked body provided by stacking a plurality of resin layers, and a plurality of coil conductor patterns provided on the stacked body, and provided with a coil including a winding axis in a stacking direction, has been known.

For example, International Publication No. 2018/174133 discloses a multilayer resin substrate including a coil conductor pattern including a non-overlapping portion that does not overlap with the other coil conductor patterns, when viewed in the stacking direction, the non-overlapping portion being curved so as to be close to the other coil conductor patterns. According to this configuration, a flow of resin near the other coil conductor patterns at a time of thermocompression bonding (when the stacked body is formed) may be significantly reduced or prevented by the curved non-overlapping portion, so that displacement, deformation, or the like of the other coil conductor patterns with the flow of resin at the time of thermocompression bonding is reduced or prevented. Therefore, a change in electrical characteristics due to the displacement or the like of the other coil conductor patterns is able to be reduced or prevented.

For the purpose of obtaining desired characteristics, an inductance value, or the like, a large number of coil conductor patterns may be overlapped with each other in a stacking direction to form a multi-turn coil in a stacked body. However, in a case in which a plurality of coil conductor patterns each including a non-overlapping portion are provided and non-overlapping portions of two adjacent coil conductor patterns in the stacking direction are overlapped with each other, unwanted capacitance is formed between the non-overlapping portions, and electrical characteristics of the coil may change.

SUMMARY OF THE INVENTION

Preferred embodiments of the present invention, in a configuration including a coil including a plurality of non-overlapping portions, provide multilayer resin substrates that each significantly reduce or prevent a change in electrical characteristics of the coil by significantly reducing or preventing unwanted capacitance between adjacent non-overlapping portions in a stacking direction, and methods of manufacturing such multilayer resin substrates.

A multilayer resin substrate according to a preferred embodiment of the present invention includes a stacked body including a plurality of resin layers stacked on each other, and a coil including a plurality of coil conductor patterns on two or more resin layers, respectively, among the plurality of resin layers, and including a winding axis in a stacking direction of the plurality of resin layers, and the plurality of coil conductor patterns include a first coil conductor pattern and a second coil conductor pattern alternately positioned in the stacking direction, the first coil conductor pattern includes a first overlapping portion that, when viewed in a stacking direction, overlaps with an adjacent second coil conductor pattern, and a first non-overlapping portion that does not overlap with the adjacent second coil conductor pattern, the second coil conductor pattern includes a second overlapping portion that, when viewed in the stacking direction, overlaps with an adjacent first coil conductor pattern, and a second non-overlapping portion that does not overlap with the adjacent first coil conductor pattern, the first non-overlapping portion protrudes more to an outer peripheral side in a radial direction of the plurality of coil conductor patterns than the adjacent second coil conductor pattern, and the second non-overlapping portion protrudes more to an inner peripheral side in the radial direction than the adjacent first coil conductor pattern.

A coil conductor pattern with a small line width is more prone to displacement or the like with a flow of resin at the time of thermocompression bonding (when a stacked body is formed) than a coil conductor pattern with a large line width. Therefore, in order to significantly reduce or prevent the displacement or the like of a coil conductor pattern at the time of thermocompression bonding, it is conceivable to provide a multilayer resin substrate including a coil conductor pattern including a wide portion having a line width larger than a line width of other coil conductor patterns. As a result, the displacement or the like of the wide portion at the time of thermocompression bonding is significantly reduced or prevented. However, even with such a configuration, some displacement or the like occurs in a narrow portion having the line width that is smaller than the wide portion, with the flow of resin at the time of thermocompression bonding. It is also possible to increase the line width of all of the coil conductor patterns of the coil. However, in such a case, when viewed in the stacking direction, the coil conductor patterns with a large line width may overlap with each other. At this time, unwanted capacitance that occurs in a portion in which the coil conductor patterns with a large line width overlap with each other may be significantly increased.

In contrast, in a configuration of a multilayer resin substrate according to a preferred embodiment the present invention, the non-overlapping portions of two adjacent coil conductor patterns (the first coil conductor pattern and the second coil conductor pattern) in the stacking direction protrude respectively in directions opposite to a radial direction. Therefore, the non-overlapping portions of the first coil conductor pattern and the second coil conductor pattern that are adjacent to each other in the stacking direction do not overlap with each other, when viewed in the stacking direction. Therefore, unwanted capacitance between the non-overlapping portions of the two adjacent coil conductor patterns is able to be significantly reduced or prevented.

A method of manufacturing a multilayer resin substrate according to a preferred embodiment of the present invention includes a coil conductor forming step of forming a plurality of coil conductor patterns including a first coil conductor pattern and a second coil conductor pattern, respectively, on two or more resin layers among a plurality of resin layers, a stacking step of stacking, after the coil conductor forming step, the plurality of resin layers such that the first coil conductor pattern and the second coil conductor pattern are alternately disposed in a stacking direction of the plurality of resin layers, forming a first overlapping portion that overlaps with an adjacent second coil conductor pattern, when viewed in the stacking direction, and a first non-overlapping portion that does not overlap with the adjacent second coil conductor pattern, when viewed in the stacking direction, and protrudes more to an outer peripheral side in a radial direction of the plurality of coil conductor patterns than the adjacent second coil conductor pattern, in the first coil conductor pattern, and forming a second overlapping portion that overlaps with an adjacent first coil conductor pattern, when viewed in the stacking direction, and a second non-overlapping portion that does not overlap with the adjacent first coil conductor pattern, when viewed in the stacking direction, and protrudes more to an inner peripheral side in the radial direction than the adjacent first coil conductor pattern, in the second coil conductor pattern, and a stacked body forming step of forming, after the stacking step, a stacked body by thermally compressing stacked plurality of resin layers.

According to the manufacturing method described above, even with a configuration including a coil in which a plurality of non-overlapping portions are provided, a multilayer resin substrate that is able to significantly reduce or prevent a change in electrical characteristics of the coil due to unwanted capacitance between the adjacent non-overlapping portions in the stacking direction is able to be easily obtained.

According to preferred embodiments of the present invention, in a configuration including a coil in which a plurality of non-overlapping portions are provided, multilayer resin substrate that each significantly reduce or prevent a change in electrical characteristics of the coil by significantly reducing or preventing unwanted capacitance between adjacent non-overlapping portions in a stacking direction is able to be achieved.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 4-1, 4-2, and 4-3 are cross-sectional view sequentially showing a process of manufacturing the multilayer resin substrate 101 according to a preferred embodiment of the present invention.

DETAILED DESCRIPTION OF THE PREFERRED EMBODIMENTS

Figure 1:
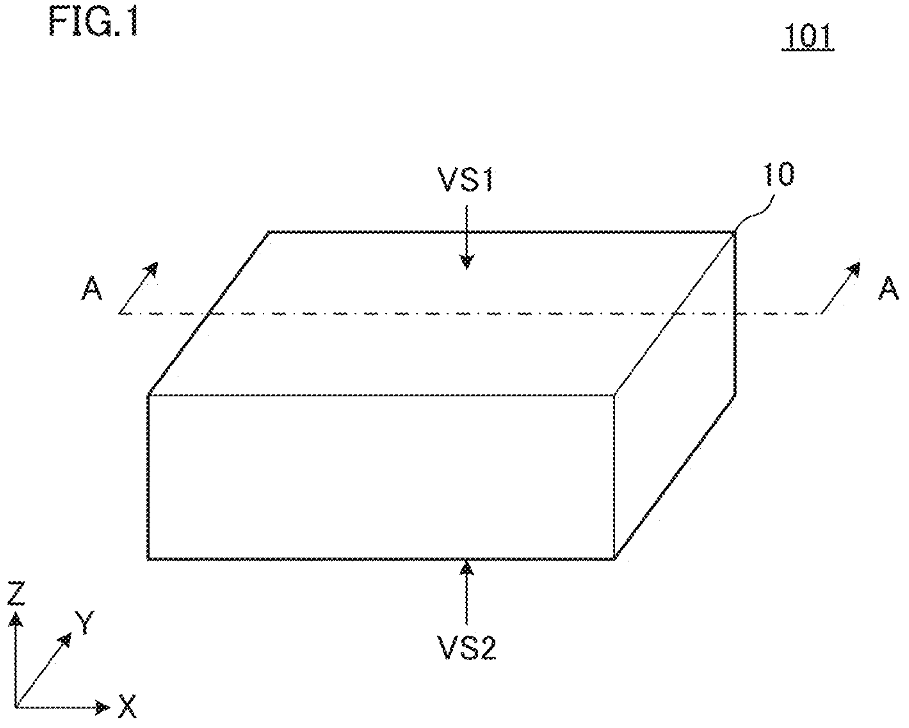
FIG. 1 is an external perspective view of a multilayer resin substrate 101 according to a first preferred embodiment of the present invention.

Hereinafter, preferred embodiments of the present invention will be described with reference to the attached drawings and several specific examples. In the drawings, components and elements denoted by the same reference numerals or symbols will represent the same or corresponding components and elements. While preferred embodiments of the present invention are divided and described for the sake of convenience in consideration of ease of description or understanding of main points, elements described in different preferred embodiments are able to be partially replaced and combined with each other. In second and subsequent preferred embodiments, a description of matters common to the first preferred embodiment will be omitted and only different points will be described. In particular, the same or substantially the same advantageous functions and effects by the same configurations will not be described one by one for each preferred embodiment.

First Preferred Embodiment

Figure 2:
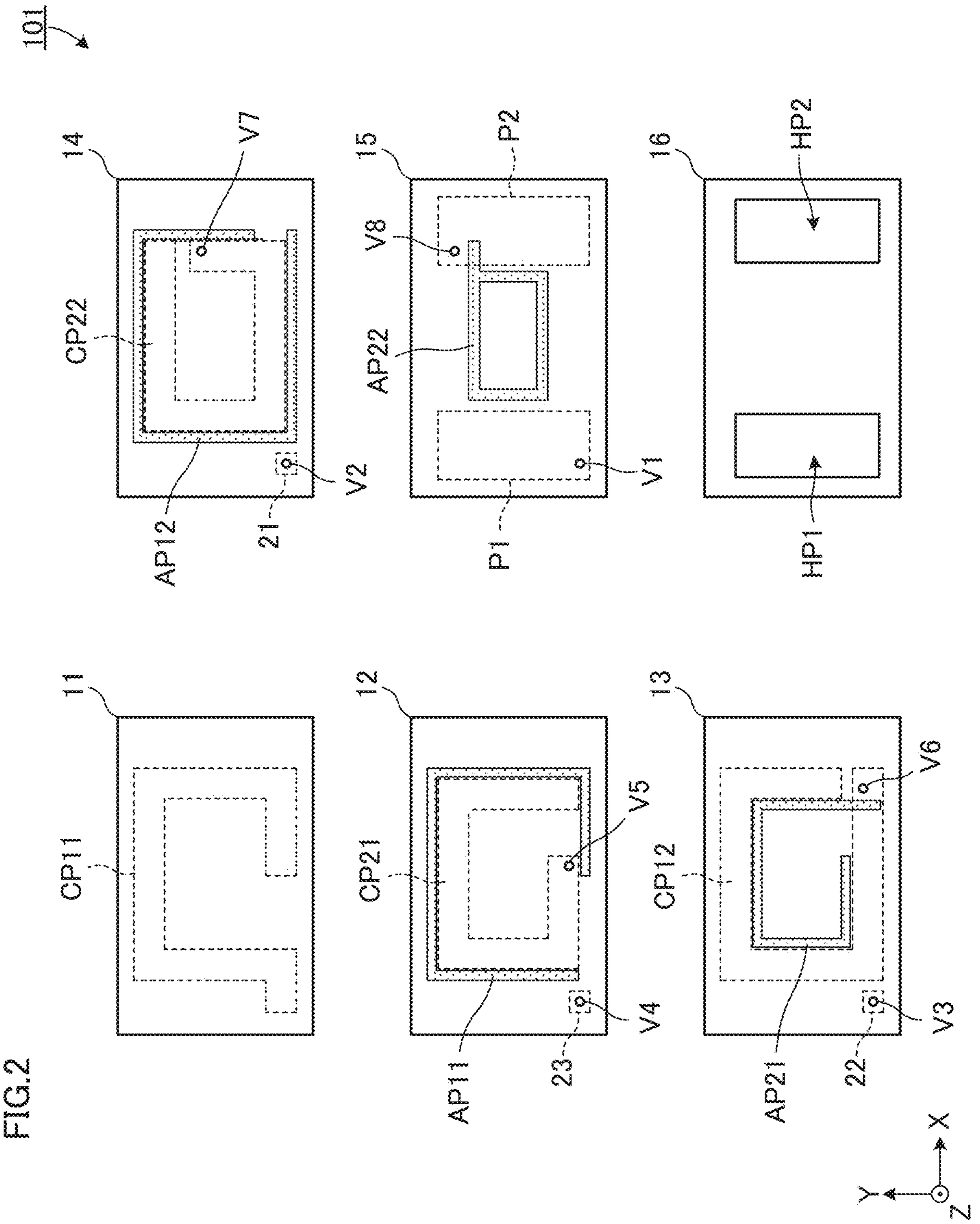
FIG. 2 is an exploded plan view of the multilayer resin substrate 101.
Figure 3:
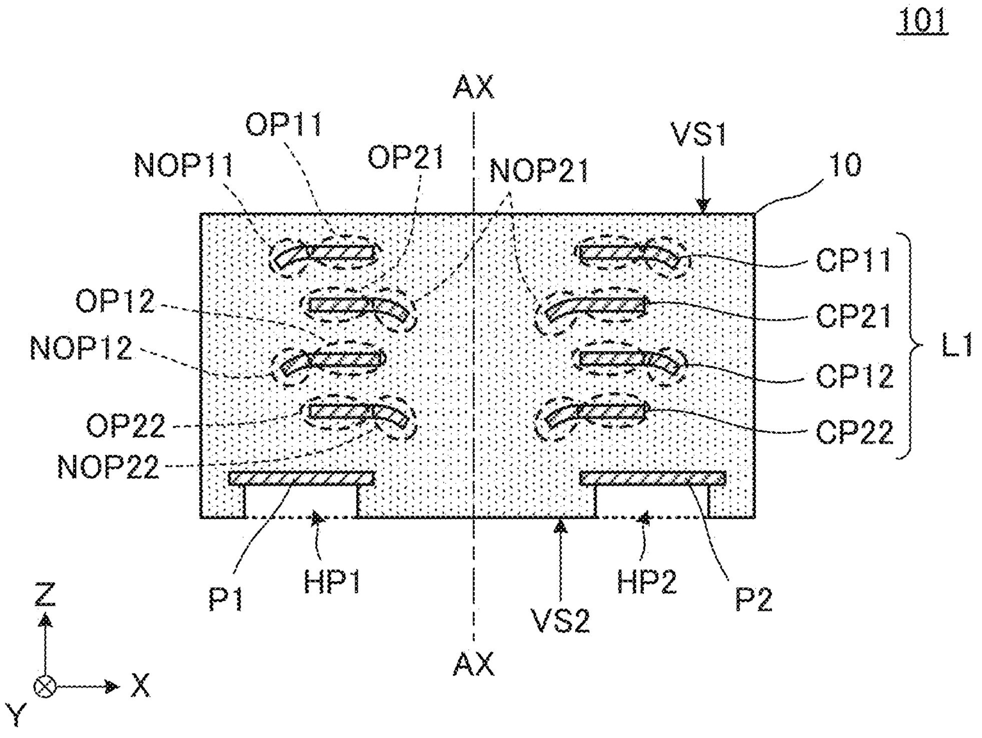
FIG. 3 is an A-A cross-sectional view in FIG. 1.

FIG. 1 is an external perspective view of a multilayer resin substrate 101 according to a first preferred embodiment of the present invention. FIG. 2 is an exploded plan view of the multilayer resin substrate 101. FIG. 3 is an A-A cross-sectional view in FIG. 1. In FIG. 2, in order to make the structure easy to understand, first openings AP11 and AP12 and second openings AP21 and AP22 are indicated by a dot pattern.

The multilayer resin substrate 101 includes a stacked body 10, a coil L1, and external electrodes P1 and P2. As will be described below, the coil L1 includes a plurality of coil conductor patterns (first coil conductor patterns CP11 and CP12, and second coil conductor patterns CP21 and CP22), and includes a winding axis AX in a Z-axis direction.

The stacked body 10 has a rectangular or substantially rectangular parallelepiped shape of which the longitudinal direction coincides with an X-axis direction. In addition, the stacked body 10 includes a first main surface VS1 and a second main surface VS2 that face each other. The coil L1 is provided inside the stacked body 10. The external electrodes P1 and P2 are exposed (provided near the second main surface VS2) to the second main surface VS2 of the stacked body 10.

The stacked body 10 is provided by sequentially stacking and thermally compressing resin layers 16, 15, 14, 13, 12, and 11. The first main surface VS1 and the second main surface VS2 of the stacked body 10 are surfaces perpendicular or substantially perpendicular to a stacking direction (the Z-axis direction) of the plurality of resin layers 11, 12, 13, 14, 15, and 16. Each of the resin layers 11 to 16 is a rectangular or substantially rectangular flat plate of which the longitudinal direction coincides with the X-axis direction. Each of the resin layers 11 to 16 has flexibility. The resin layers 11 to 16 are sheets made of a liquid crystal polymer (LCP) or a polyether ether ketone (PEEK), for example, as a main material.

A first coil conductor pattern CP11 is provided on a back surface of the resin layer 11. The first coil conductor pattern CP11 is a rectangular or substantially rectangular loop-shaped conductor pattern of about one turn wound along an outer periphery of the resin layer 11. The first coil conductor pattern CP11 is preferably a conductor pattern such as Cu foil, for example.

A second coil conductor pattern CP21 and a conductor pattern 23 are provided on a back surface of the resin layer 12. The second coil conductor pattern CP21 is a rectangular or substantially rectangular loop-shaped conductor pattern of about one turn provided along an outer periphery of the resin layer 12. The conductor pattern 23 is a rectangular or substantially rectangular conductor pattern disposed in a vicinity of a first corner (a lower left corner of the resin layer 12 in FIG. 2) of the resin layer 12. The second coil conductor pattern CP21 and the conductor pattern 23 are preferably conductor patterns such as Cu foil, for example. In addition, interlayer connection conductors V4 and V5 are provided in the resin layer 12.

Furthermore, a first opening AP11 is provided in a front surface of the resin layer 12. The first opening AP11 is a recessed portion (a groove) having a rectangular or substantially rectangular loop shape, and, when viewed in the Z-axis direction, has a planar shape extending along an outer periphery of the second coil conductor pattern CP21.

A first coil conductor pattern CP12 and a conductor pattern 22 are provided on a back surface of the resin layer 13. The first coil conductor pattern CP12 is a rectangular or substantially rectangular loop-shaped conductor pattern of about one turn provided along an outer periphery of the resin layer 13. The conductor pattern 22 is a rectangular or substantially rectangular conductor pattern disposed in the vicinity of a first corner (a lower left corner of the resin layer 13 in FIG. 2) of the resin layer 13. The first coil conductor pattern CP12 and the conductor pattern 22 are preferably conductor patterns such as Cu foil, for example. In addition, interlayer connection conductors V3 and V6 are provided in the resin layer 13.

Furthermore, a second opening AP21 is provided in a front surface of the resin layer 13. The second opening AP21 is a recessed portion (a groove) having a rectangular or substantially rectangular loop shape, and, when viewed in the Z-axis direction, has a planar shape along an inner periphery of the first coil conductor pattern CP12.

A second coil conductor pattern CP22 and a conductor pattern 21 are provided on a back surface of the resin layer 14. The second coil conductor pattern CP22 is a rectangular or substantially rectangular loop-shaped conductor pattern of about one turn provided along an outer periphery of the resin layer 14. The conductor pattern 21 is a rectangular or substantially rectangular conductor pattern disposed in the vicinity of a first corner (a lower left corner of the resin layer 14 in FIG. 2) of the resin layer 14. The second coil conductor pattern CP22 and the conductor pattern 21 are preferably conductor patterns such as Cu foil, for example. In addition, interlayer connection conductors V2 and V7 are provided in the resin layer 14.

Furthermore, a first opening AP12 is provided in a front surface of the resin layer 14. The first opening AP12 is a recessed portion (a groove) having a rectangular or substantially rectangular loop shape, and, when viewed in the Z-axis direction, has a planar shape along an outer periphery of the second coil conductor pattern CP22.

External electrodes P1 and P2 are provided on a back surface of the resin layer 15. The external electrodes P1 and P2 are rectangular or substantially rectangular conductor patterns of which the longitudinal direction coincides with a Y-axis direction. The external electrode P1 is disposed in the vicinity of a first side (a left side of the resin layer 15 in FIG. 2) of the resin layer 15. The external electrode P2 is disposed in the vicinity of a second side (a right side of the resin layer 15 in FIG. 2) of the resin layer 15. The external electrodes P1 and P2 may be conductor patterns such as Cu foil, for example. In addition, interlayer connection conductors V1 and V8 are provided in the resin layer 15.

Furthermore, a second opening AP22 is provided in a front surface of the resin layer 15. The second opening AP22 is a recessed portion (a groove) having a substantially ring planar shape. The second opening AP22, when viewed in the Z-axis direction, is disposed between the external electrodes P1 and P2.

Opening portions HP1 and HP2 are provided in the resin layer 16. The opening portion HP1 is a rectangular or substantially rectangular through hole disposed in the vicinity of a first side (a left side of the resin layer 16 in FIG. 2) of the resin layer 16. The opening portion HP2 is a rectangular or substantially rectangular through hole disposed in the vicinity of a second side (a right side of the resin layer 16 in FIG. 2) of the resin layer 16. The opening portion HP1 is provided at a position corresponding to the position of the external electrode P1. The opening portion HP2 is provided at a position corresponding to the position of the external electrode P2. Therefore, even in a case in which the resin layer 16 is stacked on the back surface of the resin layer 15, the external electrode P1 is exposed from the opening portion HP1 to outside, and the external electrode P2 is exposed from the opening portion HP2 to the outside.

As shown in FIG. 2, one end of the first coil conductor pattern CP11 is connected to one end of the second coil conductor pattern CP21 through the interlayer connection conductor V5. Furthermore, the other end of the second coil conductor pattern CP21 is connected to one end of the first coil conductor pattern CP12 through the interlayer connection conductor V6. In addition, the other end of the first coil conductor pattern CP12 is connected to one end of the second coil conductor pattern CP22 through the interlayer connection conductor V7. As described above, two or more coil conductor patterns (the first coil conductor patterns CP11 and CP12, and the second coil conductor patterns CP21 and CP22) provided on each of the two or more resin layers 11 to 14 and the interlayer connection conductors V5, V6, and V7 define the coil L1 having a winding axis AX in the Z-axis direction.

In addition, a first end of the coil L1 is connected to the external electrode P1, and a second end of the coil L1 is connected to the external electrode P2. Specifically, the other end of the first coil conductor pattern CP11 is connected to the external electrode P1 through the conductor patterns 21, 22, and 23 and the interlayer connection conductors V1, V2, V3, and V4. In addition, the other end of the second coil conductor pattern CP22 is connected to the external electrode P2 through the interlayer connection conductor V8.

As mainly shown in FIG. 3, the first coil conductor patterns CP11 and CP12 and the second coil conductor patterns CP21 and CP22 are alternately disposed in the Z-axis direction. Specifically, the first coil conductor patterns CP11 and CP12 and the second coil conductor patterns CP21 and CP22 are disposed in order of the first coil conductor pattern CP11, the second coil conductor pattern CP21, the first coil conductor pattern CP12, and the second coil conductor pattern CP22, in a negative Z direction.

The first coil conductor pattern CP11, when viewed in the Z-axis direction, includes a first overlapping portion OP11 that overlaps with an adjacent second coil conductor pattern CP21 in the Z-axis direction, and a first non-overlapping portion NOP11 that does not overlap with the second coil conductor pattern CP21. The first non-overlapping portion NOP11 protrudes more to an outer peripheral side in the radial direction (a direction parallel or substantially parallel to an XY axis, and a radiation direction around the winding axis AX, for example, the X-axis direction in FIG. 3) than the adjacent second coil conductor pattern CP21 in the Z-axis direction. In addition, in the Z-axis direction, the first non-overlapping portion NOP11 is curved so as to be closer to the second coil conductor pattern CP21 than the first overlapping portion OP11.

The first coil conductor pattern CP12, when viewed in the Z-axis direction, includes a first overlapping portion OP12 that overlaps with adjacent second coil conductor patterns CP21 and CP22 in the Z-axis direction, and a first non-overlapping portion NOP12 that does not overlap with the second coil conductor patterns CP21 and CP22. The first non-overlapping portion NOP12 protrudes more to the outer peripheral side in the radial direction than the adjacent second coil conductor patterns CP21 and CP22 in the Z-axis direction. In addition, in the Z-axis direction, the first non-overlapping portion NOP12 is curved so as to be closer to the second coil conductor pattern CP22 than the first overlapping portion OP12.

The second coil conductor pattern CP21, when viewed in the Z-axis direction, includes a second overlapping portion OP21 that overlaps with adjacent first coil conductor patterns CP11 and CP12 in the Z-axis direction, and a second non-overlapping portion NOP21 that does not overlap with the first coil conductor patterns CP11 and CP12. The second non-overlapping portion NOP21 protrudes more to an inner peripheral side in the radial direction than the adjacent first coil conductor patterns CP11 and CP12 in the Z-axis direction. In addition, in the Z-axis direction, the second non-overlapping portion NOP21 is curved so as to be closer to the first coil conductor pattern CP12 than the second overlapping portion OP21.

The second coil conductor pattern CP22, when viewed in the Z-axis direction, includes a second overlapping portion OP22 that overlaps with an adjacent first coil conductor pattern CP12 in the Z-axis direction, and a second non-overlapping portion NOP22 that does not overlap with the adjacent first coil conductor pattern CP12. The second non-overlapping portion NOP22 protrudes more to the inner peripheral side in the radial direction than the adjacent first coil conductor pattern CP12 in the Z-axis direction.

The second coil conductor pattern CP22 according to the present preferred embodiment, as shown in FIG. 3, is located (disposed closest to the external electrodes P1 and P2 in the Z-axis direction) closest to the external electrodes P1 and P2 in the Z-axis direction, among the plurality of coil conductor patterns. The second overlapping portion OP22 corresponds to an “electrode overlapping portion” that also overlaps with the external electrodes P1 and P2, when viewed in the Z-axis direction. In addition, the second non-overlapping portion NOP22 corresponds to an “electrode non-overlapping portion” that does not overlap with the external electrodes P1 and P2, when viewed in the Z-axis direction. The second non-overlapping portion (the electrode non-overlapping portion) NOP22, in the Z-axis direction, is curved so as to be closer to the external electrodes P1 and P2 than the second overlapping portion (the electrode overlapping portion) OP22.

According to the multilayer resin substrate 101 of the present preferred embodiment, the following advantageous effects are obtained.

(a) A coil conductor pattern with a small line width is more prone to displacement or the like with a flow of resin at a time of thermocompression bonding (when a stacked body is formed) than a coil conductor pattern with a large line width. Therefore, in order to significantly reduce or prevent the displacement or the like of a coil conductor pattern at the time of thermocompression bonding, it is conceivable to provide a multilayer resin substrate including a coil conductor pattern including a wide portion having a line width larger than a line width of other coil conductor patterns. As a result, the displacement or the like of the wide portion at the time of thermocompression bonding is significantly reduced or prevented. However, even with such a configuration, some displacement or the like occurs in a narrow portion having the line width smaller than the wide portion, with the flow of resin at the time of thermocompression bonding. It is also conceivable to increase the line width of all of the coil conductor patterns of a coil. However, in such a case, when viewed in a stacking direction, the coil conductor patterns with a large line width may overlap with each other. At this time, unwanted capacitance that occurs in a portion in which the coil conductor patterns with a large line width overlap with each other may be significantly increased.

In contrast, in the present preferred embodiment, as mainly shown in FIG. 3, the non-overlapping portions of two adjacent coil conductor patterns (the first coil conductor pattern and the second coil conductor pattern) in the stacking direction (the Z-axis direction) protrude respectively in directions opposite to the radial direction. Therefore, the adjacent coil conductor patterns in the Z-axis direction are alternately disposed on the inner peripheral side and the outer peripheral side in the radial direction, respectively. According to this configuration, the non-overlapping portions (the first non-overlapping portion NOP11 and the second non-overlapping portion NOP21, and the first non-overlapping portion NOP12 and second non-overlapping portions NOP21 and NOP22, for example) of the first coil conductor pattern and the second coil conductor pattern that are adjacent to each other in the Z-axis direction do not overlap with each other, when viewed in the Z-axis direction. Therefore, according to such a configuration, the adjacent coil conductor patterns in the stacking direction, even in a case of having a large line width, are able to reduce portions that overlap with each other, when viewed in the stacking direction. Therefore, unwanted capacitance between (the non-overlapping portions of) the two adjacent coil conductor patterns is able to be significantly reduced or prevented.

(b) In addition, in the present preferred embodiment, in the stacking direction, the first non-overlapping portion NOP11 of the first coil conductor pattern CP11, and the adjacent second coil conductor pattern CP21 in the Z-axis direction, are curved so as to be close to each other. Moreover, in the present preferred embodiment, in the stacking direction, the first non-overlapping portion NOP12 of the first coil conductor pattern CP12, and the adjacent second coil conductor pattern CP22 in the Z-axis direction, are curved so as to be close to each other. According to this configuration, the flow of resin near the second coil conductor patterns CP21 and CP22 at the time of thermocompression bonding is significantly reduced or prevented by curved first non-overlapping portions NOP11 and NOP12. Therefore, displacement or the like of the second coil conductor patterns CP21 and CP22 with the flow of resin at the time of thermocompression bonding is significantly reduced or prevented.

Similarly, in the present preferred embodiment, in the stacking direction, the second non-overlapping portion NOP21 of the second coil conductor pattern CP21, and the adjacent first coil conductor pattern CP12 in the Z-axis direction, are curved so as to be close to each other. Therefore, as a result, the displacement or the like of the first coil conductor pattern CP12 at the time of thermocompression bonding is also significantly reduced or prevented.

(c) In addition, in the present preferred embodiment, the non-overlapping portion (the electrode non-overlapping portion) NOP22 of the second coil conductor pattern CP22 located closest to the external electrodes P1 and P2 in the Z-axis direction is curved so as to be closer to the external electrodes P1 and P2 than the second overlapping portion (the electrode overlapping portion) OP22 in the Z-axis direction. As described above, the external electrodes P1 and P2 disposed near the second main surface VS2 is easily displaced with the flow of resin at the time of thermocompression bonding. In contrast, according to this configuration, in the Z-axis direction, the second non-overlapping portion NOP22 is curved so as to be close to the external electrodes P1 and P2 (the second main surface VS2). In such a case, a flow of resin near the external electrodes P1 and P2 that easily flow at the time of thermocompression bonding is significantly reduced or prevented. Therefore, the displacement of the external electrodes P1 and P2 is significantly reduced or prevented.

(d) According to the present preferred embodiment, the non-overlapping portion NOP12 and NOP21 are also provided in contact with other coil conductor patterns located on the inner layer side other than a first main surface-side coil conductor pattern and a second main surface-side coil conductor pattern. According to such a configuration, the flow of resin at the time of thermocompression bonding is significantly reduced or prevented by a non-overlapping portion provided in the first main-surface side coil conductor pattern and the second main surface-side coil conductor pattern and the flow of resin at the time of thermocompression bonding is significantly reduced or prevented by a non-overlapping portion provided in contact with another coil conductor pattern on the inner layer side. Therefore, the displacement of the entire coil is significantly reduced or prevented in comparison with a case in which the non-overlapping portion is only provided in contact with the first main surface-side coil conductor pattern and the second main surface-side coil conductor pattern. It is to be noted that, in the present preferred embodiment, the first main surface-side coil conductor pattern, for example, corresponds to the first coil conductor pattern CP11 located closest to the first main surface VS1 in the Z-axis direction, among the plurality of coil conductor patterns. In addition, in the present preferred embodiment, the second main surface-side coil conductor pattern, for example, corresponds to the second coil conductor pattern CP22 located closest to the second main surface VS2 in the Z-axis direction, among the plurality of coil conductor patterns. Furthermore, in the present preferred embodiment, other coil conductor patterns located on the inner layer side, for example, correspond the first coil conductor pattern CP12 and the second coil conductor pattern CP21.

(e) As with the multilayer resin substrate 101 according to the present preferred embodiment, in a case in which internal and external shapes of the coil conductor pattern are rectangular or substantially rectangular (polygonal shapes), the non-overlapping portion provided in contact with a certain one coil conductor pattern is preferably disposed on at least two sides (a left side and a right side of the first coil conductor pattern in FIG. 2, for example) that face each other when viewed in the Z-axis direction. According to this configuration, the displacement of a coil (or a coil conductor pattern) with the flow of resin at the time of thermocompression bonding is effectively reduced or prevented by the non-overlapping portions provided on the two sides that face each other.

(f) In addition, as with the multilayer resin substrate 101 according to the present preferred embodiment, in the case in which the internal and external shapes of the coil conductor pattern are rectangular or substantially rectangular (polygonal shapes), the non-overlapping portion provided in contact with one certain coil conductor pattern is preferably disposed on three or more sides, when viewed in the Z-axis direction. According to this configuration, in comparison with a case in which the non-overlapping portion is provided on the two sides, when viewed in the Z-axis direction, the advantageous effect of significantly reducing or preventing the displacement of the coil by the non-overlapping portion is further increased.

While the present preferred embodiment shows an example in which the internal and external shapes of the coil conductor pattern are rectangular or substantially rectangular (polygonal shapes), the multilayer resin substrates of preferred embodiments of the present invention are not limited to such a configuration. The internal and external shapes of the coil conductor pattern are able to be appropriately changed. For example, the internal and external shapes of the coil conductor pattern may be a circular or substantially circular shape, an elliptical or substantially elliptical shape, an L shape, or a suitable shape. In such a case, the non-overlapping portion provided in contact with one certain coil conductor pattern, with respect to the winding axis AX of the coil, is preferably located in at least two directions among four orthogonal or substantially orthogonal directions (a positive X direction, a positive Y direction, a negative X direction, and a negative Y direction, for example) when viewed in the Z-axis direction. In particular, in a case in which the non-overlapping portion, with respect to the winding axis AX, is located in each of the two parallel or substantially parallel directions (the positive X direction and the negative X direction, for example) among the four orthogonal or substantially orthogonal directions when viewed in the Z-axis direction, the displacement of the coil with the flow of resin at the time of thermocompression bonding is effectively reduced or prevented.

In addition, in a case in which the advantageous effect of significantly reducing or preventing the displacement of a coil at the time of thermocompression bonding is further increased, the non-overlapping portion, when viewed in the Z-axis direction, is preferably disposed (located in at least three directions among the four orthogonal or substantially orthogonal directions when viewed in the Z-axis direction) so as to surround the winding axis AX. As a result, the advantageous effect of significantly reducing or preventing the displacement of a coil by the non-overlapping portion is further increased.

The present preferred embodiment shows the multilayer resin substrate 101 in which the non-overlapping portion is provided over an entire or substantially an entire length of one coil conductor pattern. However, the multilayer resin substrate of preferred embodiments of the present invention is not limited to such a configuration. When the non-overlapping portion provided in contact with one certain coil conductor pattern is provided in one-fifth or more portion of the entire or substantially the entire length of the coil conductor pattern, the advantageous functions and effects of the present invention are obtained. Furthermore, the number of turns of each of the first coil conductor pattern and the second coil conductor pattern is not limited to one. The number of turns may be different for each coil conductor pattern.

The multilayer resin substrate 101 according to the present preferred embodiment is manufactured by, for example, the following non-limiting example of a manufacturing method. FIGS. 4-1, 4-2, and 4-3 are cross-sectional view sequentially showing a process of manufacturing the multilayer resin substrate 101. In FIGS. 4-1, 4-2, and 4-3, for the sake of convenience of explanation, although the explanation will be provided in a manufacturing process for one chip (an individual piece), the actual process of manufacturing the multilayer resin substrate 101 is performed in a collective substrate state. The "collective substrate" refers to a substrate including a plurality of multilayer resin substrates 101. The same applies to each cross-sectional view showing the subsequent manufacturing steps of the multilayer resin substrate.

Figures 3, 4:
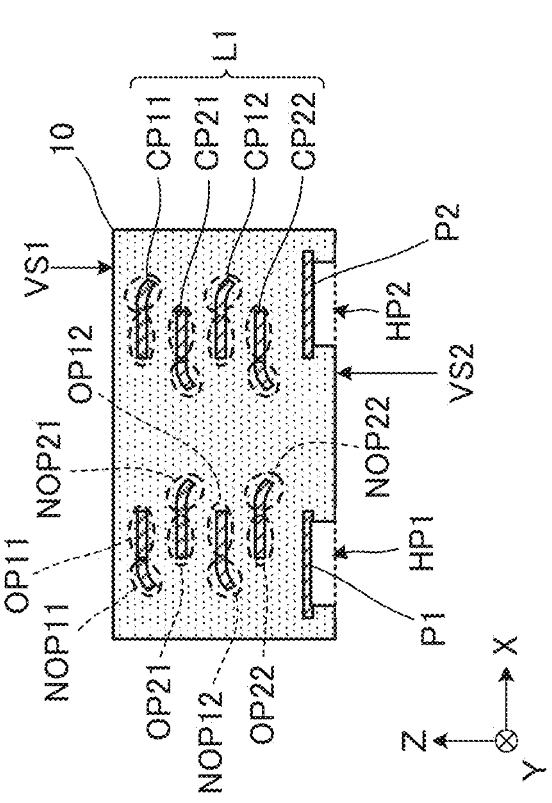
Figures 1, 4:
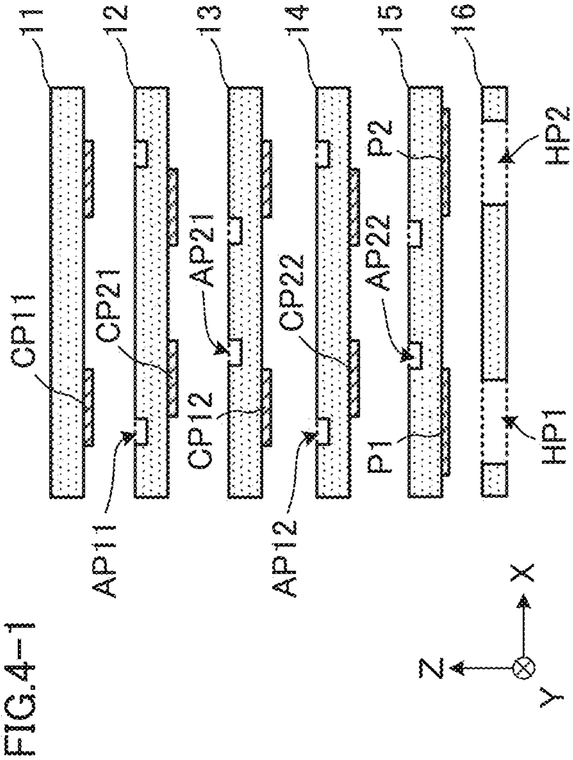
Figures 2, 4:
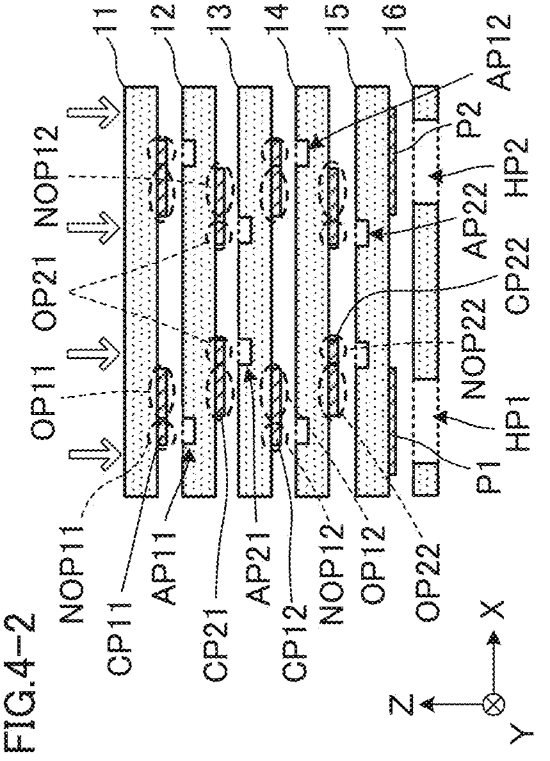

First, as shown in FIG. 4-1, a plurality of resin layers 11, 12, 13, 14, 15, and 16 are prepared. The resin layers 11 to 16 are sheets made of a material, such as a liquid crystal polymer (LCP) or a polyether ether ketone (PEEK), for example.

Subsequently, a plurality of coil conductor patterns (the first coil conductor patterns CP11 and CP12, and the second coil conductor patterns CP21 and CP22), the external electrodes P1 and P2, and the like are formed on the resin layers 11 to 15. Specifically, metal foil (Cu foil, for example) is laminated on a back surface of the resin layers 11 to 15. Then, the metal foil is patterned by photolithography, for example. As a result, the first coil conductor pattern CP11 is formed on the back surface of the resin layer 11, the second coil conductor pattern CP21 is formed on the back surface of the resin layer 12, the first coil conductor pattern CP12 is formed on the back surface of the resin layer 13, and the second coil conductor pattern CP22 is formed on the back surface of the resin layer 14. In addition, the external electrodes P1 and P2 are formed on the back of the resin layer 15.

As described above, this step of forming the plurality of coil conductor patterns (the first coil conductor patterns CP11 and CP12, and the second coil conductor patterns CP21 and CP22) on the two or more resin layers 11 to 14, respectively, is an example of a "coil conductor forming step".

In addition, interlayer connection conductors (interlayer connection conductors V1 to V8 in FIG. 2) are formed in the resin layers 11 to 15. The interlayer connection conductors are provided by forming a hole by laser irradiation, a drill, or the like, for example, and then providing (filling) the hole with conductive paste including metal powder including, for example, Cu and Sn or an alloy including Cu and Sn, and a resin material and then solidifying the conductive paste by the subsequent thermocompression bonding.

Furthermore, opening portions HP1 and HP2 are formed in the resin layer 16. The opening portion HP1 is a rectangular or substantially rectangular through hole disposed in the vicinity of a first side (a left side of the resin layer 16 in FIGS. 4-1, 4-2, and 4-3) of the resin layer 16. The opening portion HP2 is a rectangular or substantially rectangular through hole disposed in the vicinity of a second side (a right side of the resin layer 16 in FIGS. 4-1, 4-2, and 4-3) of the resin layer 16. The opening portions HP1 and HP2 are formed by etching the resin layer 16, for example, by a laser or the like. In addition, the opening portions HP1 and HP2 may be formed by, for example, punching or the like.

Subsequently, a first opening AP11 of a predetermined shape is formed in the resin layer 12, and a first opening AP12 of a predetermined shape is formed in the resin layer 14. The first opening AP11 is a recessed portion (a groove) having the same or substantially the same shape as the first non-overlapping portion NOP11 of the first coil conductor pattern CP11. The first opening AP12 is a recessed portion (a groove) having the same or substantially the same shape as the first non-overlapping portion NOP12 of the first coil conductor pattern CP12. Moreover, a second opening AP21 of a predetermined shape is formed in the resin layer 13, and a second opening AP22 of a predetermined shape is formed in the resin layer 15. The second opening AP21 is a recessed portion (a groove) having the same or substantially the same shape as the second non-overlapping portion NOP21 of the second coil conductor pattern CP21. The second opening AP22 is a recessed portion (a groove) having the same or substantially the same shape as the second non-overlapping portion NOP22 of the second coil conductor pattern CP22.

As described above, a step of forming the first openings AP11 and AP12 of a predetermined shape, and the second openings AP21 and AP22 of a predetermined shape in the plurality of resin layers 12 to 15, respectively, is an example of an "opening forming step".

Next, as shown in FIG. 4-2, the first coil conductor patterns CP11 and CP12 and the second coil conductor patterns CP21 and CP22 are stacked (placed) so as to be alternately disposed in the Z-axis direction. In such a case, the resin layers 11 to 16 are stacked (placed) in order of the resin layers 16, 15, 14, 13, 12, and 11.

At this time, in the first coil conductor pattern CP11, when viewed in the Z-axis direction, a first overlapping portion OP11 that overlaps with the adjacent second coil conductor pattern CP21 in the Z-axis direction, and a first non-overlapping portion NOP11 that does not overlap with the second coil conductor pattern CP21 are formed. In addition, in the first coil conductor pattern CP12, when viewed in the Z-axis direction, a first overlapping portion OP12 that overlaps with the adjacent second coil conductor patterns CP21 and CP22 in the Z-axis direction, and a first non-overlapping portion NOP12 that does not overlap with the second coil conductor patterns CP21 and CP22 are formed.

Moreover, in the second coil conductor pattern CP21, when viewed in the Z-axis direction, a second overlapping portion OP21 that overlaps with the adjacent first coil conductor patterns CP11 and CP12 in the Z-axis direction, and a second non-overlapping portion NOP21 that does not overlap with the first coil conductor patterns CP11 and CP12 are formed. Furthermore, in the second coil conductor pattern CP22, when viewed in the Z-axis direction, a second overlapping portion OP22 that overlaps with the adjacent first coil conductor pattern CP12 in the Z-axis direction, and a second non-overlapping portion NOP22 that does not overlap with the first coil conductor pattern CP12 are formed.

The first non-overlapping portion NOP11 of the first coil conductor pattern CP11 protrudes more to the outer peripheral side in the radial direction (X-axis direction in FIGS. 4-1, 4-2, and 4-3, for example) than the second coil conductor pattern CP21. In addition, the first non-overlapping portion NOP12 of the first coil conductor pattern CP12 protrudes more to the outer peripheral side in the radial direction than the second coil conductor patterns CP21 and CP22. Moreover, the second non-overlapping portion NOP21 of the second coil conductor pattern CP21 protrudes more to the inner peripheral side in the radial direction than the first coil conductor patterns CP11 and CP12. The second non-overlapping portion NOP22 of the second coil conductor pattern CP22 protrudes more to the inner peripheral side in the radial direction than the first coil conductor pattern CP12.

Furthermore, when the plurality of resin layers 11 to 16 are stacked, when viewed in the Z-axis direction, the first opening AP11 overlaps with the first non-overlapping portion NOP11, and the first opening AP12 overlaps with the first non-overlapping portion NOP12. In addition, when the plurality of resin layers 11 to 16 are stacked, when viewed in the Z-axis direction, the second opening AP21 overlaps with the second non-overlapping portion NOP21, and the second opening AP22 overlaps with the second non-overlapping portion NOP22.

As described above, a step of stacking, after the "coil conductor forming step," the plurality of resin layers 11 to 16 so that the first coil conductor patterns CP11 and CP12 and the second coil conductor patterns CP21 and CP22 may be alternately disposed in the Z-axis direction, is an example of the "stacking step".

Subsequently, the plurality of resin layers 11 to 16 that have been stacked are thermally compressed (collectively pressed) to form the stacked body 10 (the multilayer resin substrate 101) shown in in FIG. 4-3. Specifically, the stacked resin layers 11 to 16, while being heated, are subjected to quasi-isostatic pressing (pressurization) from a direction of the white arrow shown in in FIG. 4-2.

At this time, the first non-overlapping portions NOP11 and NOP12 of the first coil conductor patterns CP11 and CP12 have a smaller number of overlapping conductor patterns when viewed in the Z-axis direction than the first overlapping portions OP11 and OP12. Therefore, in comparison with the resin near the first overlapping portions OP11 and OP12, the resin near the first non-overlapping portions NOP11 and NOP12 at the time of thermocompression bonding is easy to deform. Accordingly, the first non-overlapping portion NOP11 of the first coil conductor pattern CP11 is curved in the stacking direction so as to be closer to the second coil conductor pattern CP21 than the first overlapping portion OP11. In addition, the first non-overlapping portion NOP12 of the first coil conductor pattern CP12 is curved in the stacking direction so as to be closer to the second coil conductor pattern CP22 than the first overlapping portion OP12.

Moreover, the second non-overlapping portions NOP21 and NOP22 of the second coil conductor patterns CP21 and CP22 include the smaller number of overlapping conductor patterns when viewed in the Z-axis direction than the second overlapping portions OP21 and OP22. Therefore, in comparison with the resin near the second overlapping portions OP21 and OP22, the resin near the second non-overlapping portions NOP21 and NOP22 at the time of thermocompression bonding is easy to deform. Accordingly, the second non-overlapping portion NOP21 of the second coil conductor pattern CP21 is curved in the stacking direction so as to be closer to the first coil conductor pattern CP12 than the second overlapping portion OP21. In addition, the second non-overlapping portion NOP22 of the second coil conductor pattern CP22 is curved in the stacking direction so as to be closer to the external electrodes P1 and P2 than the second overlapping portion OP22.

As described above, a step of thermally compressing, after the "stacking step," the stacked resin layers 11 to 16 to form the stacked body 10 is an example of the "stacked body forming step".

According to the non-limiting example of a manufacturing method described above, even with a configuration including a coil in which a plurality of non-overlapping portions are provided, a multilayer resin substrate 101 capable of significantly reducing or preventing a change in electrical characteristics of the coil due to unwanted capacitance to be formed between the adjacent non-overlapping portions in the Z-axis direction is able to be easily obtained.

In addition, in the non-limiting example of a manufacturing method described above, the first openings (the recessed portions) AP11 and AP12 are respectively provided at positions that overlap with the first non-overlapping portions NOP11 and NOP12, and the second openings (the recessed portions) AP21 and AP22 are respectively provided at positions that overlap with the second non-overlapping portions NOP21 and NOP22. As a result, a direction in which the non-overlapping portions (the first non-overlapping portions NOP11 and NOP12, and the second non-overlapping portions NOP21 and NOP22) are curved at the time of thermocompression bonding is easily controlled. The curved shape or the like (such as a curvature relative to an overlapping portion) of the non-overlapping portion is able to be adjusted, depending on a shape, a depth, or the like of the openings (the first openings AP11 and AP12, and the second openings AP21 and AP22) being the recessed portions.

Furthermore, in the present preferred embodiment, the opening provided at a position that overlaps with the non-overlapping portion is a recessed portion (a groove). Therefore, in comparison with a case (that will be described below) in which the opening is a through hole, a short circuit (a short circuit between adjacent coil conductor patterns in the Z-axis direction, in particular) due to the non-overlapping portions curved at the time of thermocompression bonding is able to be significantly reduced or prevented.

It is to be noted that the manufacturing method described above shows an example in which the first opening AP11 is formed in the front surface (a resin layer in contact with the first non-overlapping portion NOP11) of the resin layer 12 and the first opening AP12 is formed in the front surface (a resin layer in contact with the first non-overlapping portion NOP12) of the resin layer 14. However, the multilayer resin substrate of the present invention is not limited to such a manufacturing method. The first opening AP11 may be formed, for example, in a back surface of the resin layer 12 or may be formed in both front and back surfaces of the resin layer 12. In addition, the first opening AP12 may be formed in a back surface of the resin layer 14 or may be formed in both front and back surfaces of the resin layer 14. Similarly, the second opening AP21 may be formed, for example, in a back surface of the resin layer 13 or may be formed in both front and back surfaces of the resin layer 13. In addition, the second opening AP22 may be formed in a back surface of the resin layer 15 or may be formed in both front and back surfaces of the resin layer 15.

Furthermore, the first openings AP11 and AP12 and the second openings AP21 and AP22 are not limited to recessed portions (grooves). The first openings AP11 and AP12 and the second openings AP21 and AP22 may be through holes that extend from the front surface to the back surface of a resin layer. However, in a case in which the opening is a through hole, due to the non-overlapping portions (the first non-overlapping portions NOP11 and NOP12, and the second non-overlapping portions NOP21 and NOP22) curved at the time of thermocompression bonding, a short circuit between the first coil conductor pattern and the second coil conductor pattern that are adjacent to each other in the Z-axis direction is easy to occur. Therefore, in the case in which the opening is a through hole, a stacked body in which another resin layer including no opening is interposed between a non-overlapping portion and opening is preferably formed. Specifically, another resin layer is preferably interposed between the resin layers 11 and 12, between the resin layers 12 and 13, and between the resin layers 13 and 14.

Second Preferred Embodiment

A second preferred embodiment of the present invention shows an example of a multilayer resin substrate including a plurality of spiral-shaped coil conductor patterns.

Figure 5:
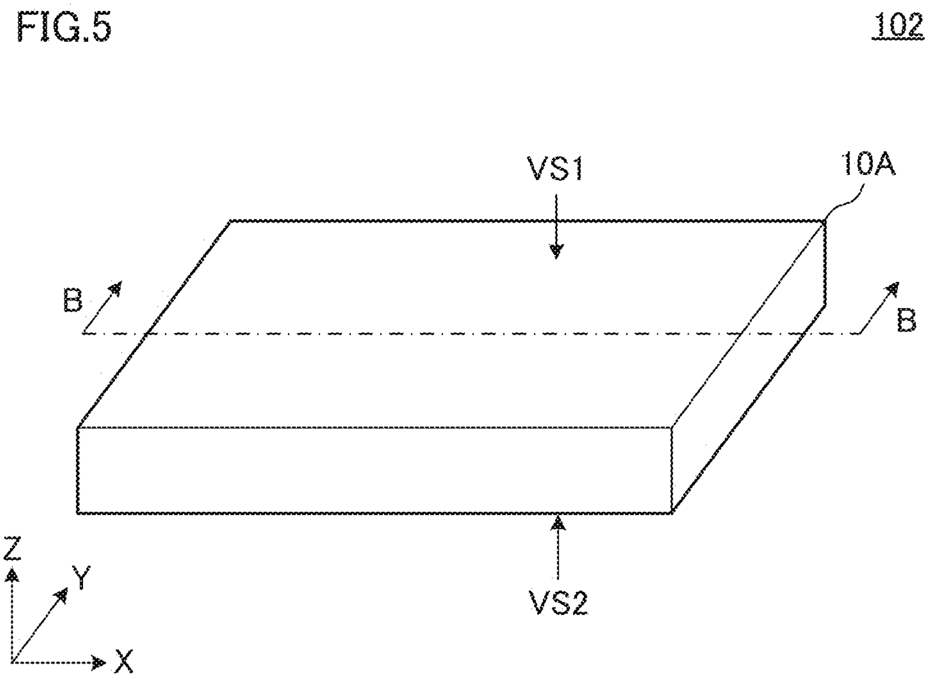
FIG. 5 is an external perspective view of a multilayer resin substrate 102 according to a second preferred embodiment of the present invention.
Figure 6:
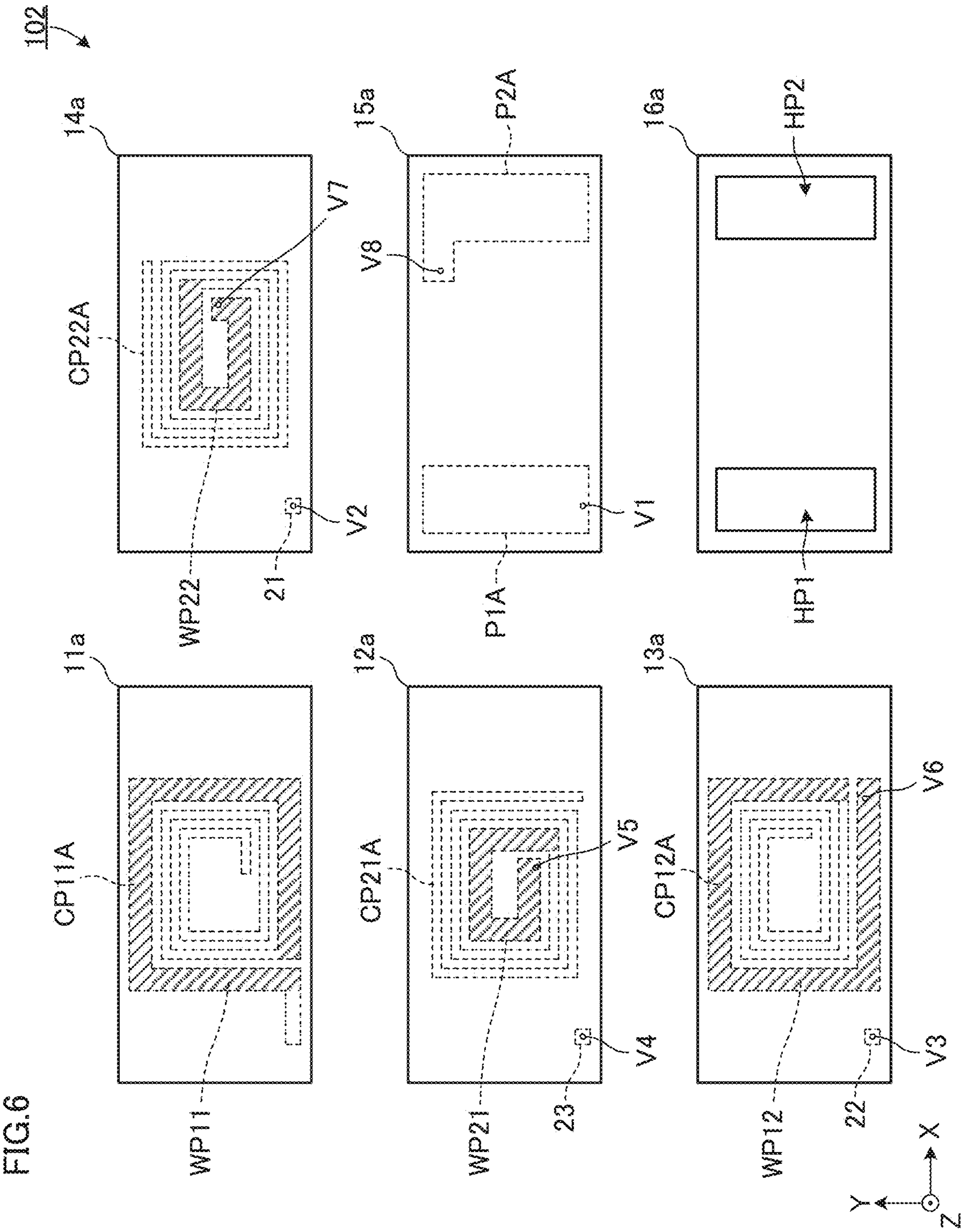
FIG. 6 is an exploded plan view of the multilayer resin substrate 102.
Figure 7:
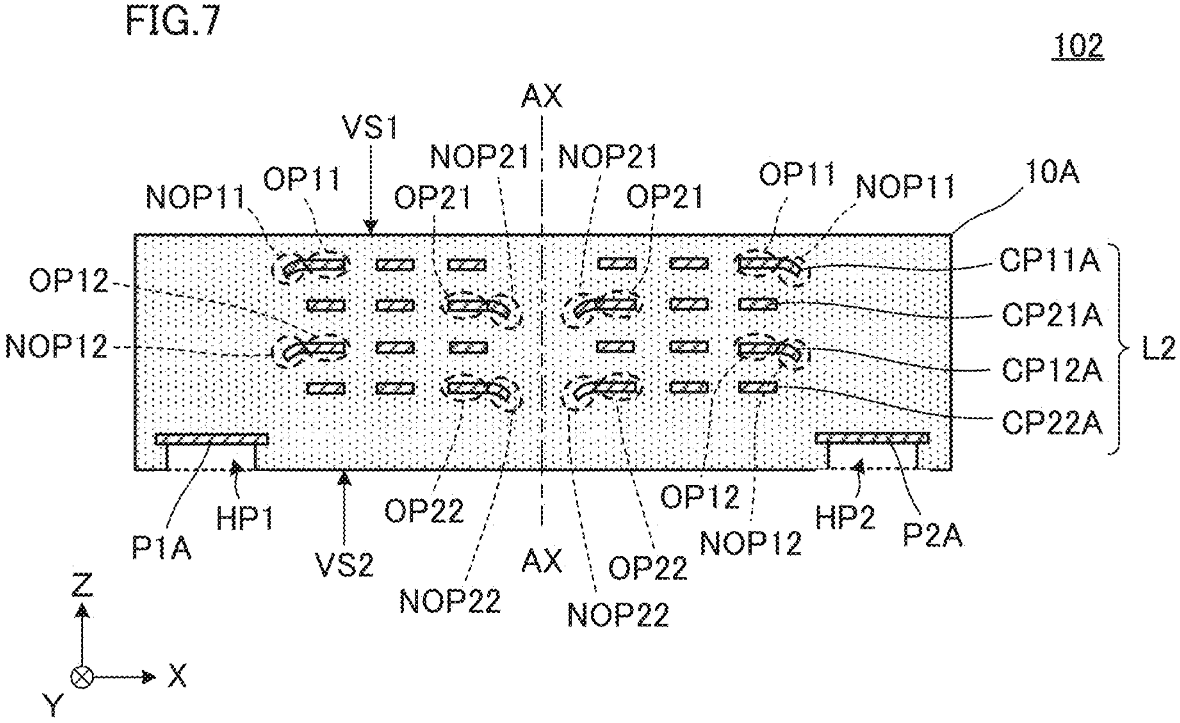
FIG. 7 is a B-B cross-sectional view in FIG. 5.

FIG. 5 is an external perspective view of a multilayer resin substrate 102 according to the second preferred embodiment of the present invention. FIG. 6 is an exploded plan view of the multilayer resin substrate 102. FIG. 7 is a B-B cross-sectional view in FIG. 5. It is to be noted that, in FIG. 6, in order to make the structure easy to understand, wide portions WP11 and WP12 of first coil conductor patterns CP11A and CP12A and wide portions WP21 and WP22 of second coil conductor patterns CP21A and CP22A are indicated by hatching.

The multilayer resin substrate 102 includes a stacked body 10A, a coil L2, and external electrodes P1A and P2A. The stacked body 10A has a longer length in the longitudinal direction (the X-axis direction) than the stacked body 10 described in the first preferred embodiment. Other configurations of the stacked body 10A are the same or substantially the same as the configurations of the stacked body 10.

Hereinafter, differences from the multilayer resin substrate 101 according to the first preferred embodiment will be described.

The stacked body 10A is provided by sequentially stacking and thermally compressing resin layers 16*a*, 15*a*, 14*a*, 13*a*, 12*a*, and 11*a*. The resin layers 11*a* to 16*a* have a longer length in the longitudinal direction than the resin layers 11 to 16 described in the first preferred embodiment. Other configurations of the resin layers 11*a* to 16*a* are the same or substantially the same as the configurations of the resin layers 11 to 16.

A first coil conductor pattern CP11A is provided on a back surface of the resin layer 11*a*. The first coil conductor pattern CP11A is disposed near the center in the longitudinal direction of the resin layer 11*a*. The first coil conductor pattern CP11A is a rectangular or substantially rectangular spiral-shaped conductor pattern of about 2.75 turns, for example. The first coil conductor pattern CP11A includes a wide portion WP11 in an outermost peripheral portion (about one turn portion located on an outermost peripheral side) in a radial direction.

A second coil conductor pattern CP21A and a conductor pattern 23 are provided on a back surface of the resin layer 12*a*. The second coil conductor pattern CP21A is disposed near the center in the longitudinal direction of the resin layer 12*a*. The second coil conductor pattern CP21A is a rectangular or substantially rectangular spiral-shaped conductor pattern of about three turns, for example. The second coil conductor pattern CP21A includes a wide portion WP21 in an innermost peripheral portion (about one turn portion located on an innermost peripheral side) in the radial direction. The conductor pattern 23 is the same or substantially the same as the conductor pattern described in the first preferred embodiment.

A first coil conductor pattern CP12A and a conductor pattern 22 are provided on a back surface of the resin layer 13*a*. The first coil conductor pattern CP12A is disposed near the center in the longitudinal direction of the resin layer 13*a*. The first coil conductor pattern CP12A is a rectangular or substantially rectangular spiral-shaped conductor pattern of about three turns, for example. The first coil conductor pattern CP12A includes a wide portion WP12 in the outermost peripheral portion in the radial direction. The conductor pattern 22 is the same or substantially the same as the conductor pattern described in the first preferred embodiment.

A second coil conductor pattern CP22A and a conductor pattern 21 are provided on a back surface of the resin layer 14*a*. The second coil conductor pattern CP22A is disposed near the center in the longitudinal direction of the resin layer 14*a*. The second coil conductor pattern CP22A is a rectangular or substantially rectangular spiral-shaped conductor pattern of about three turns, for example. The second coil conductor pattern CP22A includes a wide portion WP22 in the innermost peripheral portion in the radial direction. The conductor pattern 21 is the same or substantially the same as the conductor pattern described in the first preferred embodiment.

External electrodes P1A and P2A are provided on a back surface of the resin layer 15*a*. The external electrode P1A is the same or substantially the same as the external electrode P1 described in the first preferred embodiment. The external electrode P2A is disposed in the vicinity of a second side (a right side of the resin layer 15*a* in FIG. 6) of the resin layer 15*a*. The external electrode P2A is an L-shaped conductor pattern. In addition, opening portions HP1 and HP2 are provided in the resin layer 16*a*. The opening portions HP1 and HP2 are the same or substantially the same as the opening portions described in the first preferred embodiment.

As shown in FIG. 6, one end of the first coil conductor pattern CP11A is connected to one end of the second coil conductor pattern CP21A through the interlayer connection conductor V5. In addition, the other end of the second coil conductor pattern CP21A is connected to one end of the first coil conductor pattern CP12A through the interlayer connection conductor V6. The other end of the first coil conductor pattern CP12A is connected to one end of the second coil conductor pattern CP22A through the interlayer connection conductor V7. As described above, three or more coil conductor patterns (the first coil conductor patterns CP11A and CP12A, and the second coil conductor patterns CP21A and CP22A) provided on each of the three or more resin layers 11*a* to 14*a* and the interlayer connection conductors V5, V6, and V7 define the coil L2 having a winding axis AX in the Z-axis direction.

In addition, a first end of the coil L2 is connected to the external electrode P1A. Moreover, a second end of the coil L2 is connected to the external electrode P2A. Specifically, the other end of the first coil conductor pattern CP11A is connected to the external electrode P1A through the conductor patterns 21, 22, and 23 and the interlayer connection conductors V1, V2, V3, and V4. In addition, the other end of the second coil conductor pattern CP22A is connected to the external electrode P2A through the interlayer connection conductor V8.

As shown in FIG. 7, a large portion of the coil L2 according to the present preferred embodiment, when viewed in the Z-axis direction, does not overlap with the external electrodes P1A and P2A. In addition, the first coil conductor patterns CP11A and CP12A and the second coil conductor patterns CP21A and CP22A are alternately disposed in the Z-axis direction. Specifically, the first coil conductor patterns CP11A and CP12A, and the second coil conductor patterns CP21A and CP22A are disposed in order of the first coil conductor pattern CP11A, the second coil conductor pattern CP21A, the first coil conductor pattern CP12A, and the second coil conductor pattern CP22A, in the negative Z direction.

The wide portion (the outermost peripheral portion) of the first coil conductor pattern CP11A, as shown in FIG. 7, when viewed in the Z-axis direction, includes a first overlapping portion OP11 that overlaps with an adjacent second coil conductor pattern CP21A in the Z-axis direction, and a first non-overlapping portion NOP11 that does not overlap with the adjacent second coil conductor pattern CP21A. The first non-overlapping portion NOP11 protrudes more to the outer peripheral side in the radial direction than the second coil conductor pattern CP21. In addition, the first non-overlapping portion NOP11 is curved so as to be closer to the second coil conductor pattern CP21A than the first overlapping portion OP11.

The wide portion (the innermost peripheral portion) of the second coil conductor pattern CP21A, when viewed in the Z-axis direction, includes a second overlapping portion OP21 that overlaps with the adjacent first coil conductor patterns CP11A and CP12A in the Z-axis direction, and a second non-overlapping portion NOP21 that does not overlap with the first coil conductor patterns CP11A and CP12A. The second non-overlapping portion NOP21 protrudes more to the inner peripheral side in the radial direction than the first coil conductor patterns CP11A and CP12A. In addition, the second non-overlapping portion NOP21 is curved so as to be closer to the first coil conductor pattern CP12A than the second overlapping portion OP21.

The wide portion (the outermost peripheral portion) of the first coil conductor pattern CP12A, when viewed in the Z-axis direction, includes a first overlapping portion OP12 that overlaps with the adjacent second coil conductor patterns CP21A and CP22A in the Z-axis direction, and a first non-overlapping portion NOP12 that does not overlap with the second coil conductor patterns CP21A and CP22A. The first non-overlapping portion NOP12 protrudes more to the outer peripheral side in the radial direction than the second coil conductor patterns CP21A and CP22A. In addition, the first non-overlapping portion NOP12 is curved so as to be closer to the second coil conductor pattern CP22A than the first overlapping portion OP12.

The wide portion (the innermost peripheral portion) of the second coil conductor pattern CP22A, when viewed in the Z-axis direction, includes a second overlapping portion OP22 that overlaps with the adjacent first coil conductor pattern CP12A in the Z-axis direction, and a second non-overlapping portion NOP22 that does not overlap with the first coil conductor pattern CP12A. The second non-overlapping portion NOP22 protrudes more to the inner peripheral side in the radial direction than the first coil conductor pattern CP12A. In addition, the second non-overlapping portion NOP22 is curved so as to be closer to the second main surface VS2 than the second overlapping portion OP22.

As shown in the present preferred embodiment, each of the plurality of coil conductor patterns may have a spiral shape with two or more turns, for example. The plurality of coil conductor patterns are not limited to a configuration in which the plurality of coil conductor patterns each have the same or substantially the same number of turns. In other words, the plurality of coil conductor patterns each may have a different number of turns.

It is to be noted that, while the present preferred embodiment shows an example in which the wide portions WP11 and WP12 are located only in the outermost peripheral portion in the radial direction of the spiral-shaped first coil conductor patterns CP11A and CP12A, the multilayer resin substrates of preferred embodiments of the present invention are not limited to such a configuration. The wide portions WP11 and WP12 may be provided in portions other than the outermost peripheral portion of the spiral-shaped first coil conductor pattern, or the entirety or substantially the entirety of the first coil conductor pattern may be a wide portion. Similarly, the wide portions WP21 and WP22 may be provided in portions other than the innermost peripheral portion of the spiral-shaped second coil conductor pattern CP21A and CP22A, or the entirety or substantially the entirety of the spiral-shaped second coil conductor pattern may be a wide portion.

Other Preferred Embodiments

While each of the above described preferred embodiments shows an example in which the stacked body has a rectangular or substantially rectangular parallelepiped shape of which the longitudinal direction extends in the X-axis direction, the shape of the stacked body is not limited to such a configuration. The shape of the stacked body is able to be appropriately changed within the scope of producing the functions and advantageous effects of the present invention. The planar shape of the stacked body may be a polygonal shape, a circular shape, an elliptical shape, an L shape, a U shape, a crank shape, a T shape, a Y-shape, or a suitable shape, for example.

In addition, each of the above described preferred embodiments shows an example of the stacked body formed by thermally compressing six resin layers. However, the stacked bodies according to preferred embodiments of the present invention are not limited to such a configuration. The number of layers of the resin layers included in the stacked body is able to be appropriately changed. In addition, a protective film such as a coverlay film and a resist film may be provided on a surface of the stacked body.

The above preferred embodiments of the present invention show examples of the coil L1 and the coil L2 of which the winding axis AX coincides with the Z-axis direction. However, the winding axis AX of the coil and the Z-axis direction are not required to strictly coincide with each other. In various preferred embodiments of the present invention, "including the winding axis in the stacking direction of the plurality of resin layers" include an example in which the winding axis AX of the coil extending in a range from about minus 30 degrees to about plus 30 degrees with respect to the Z-axis direction, for example.

Each of the above described preferred embodiments shows an example in which the first coil conductor pattern is located closest to the first main surface VS1, among the plurality of coil conductor patterns, and the second coil conductor pattern is located closest to the second main surface VS2, among the plurality of coil conductor patterns. However, the arrangement of the first coil conductor pattern and the second coil conductor pattern is not limited to such a configuration. The first coil conductor pattern and the second coil conductor pattern may be alternately disposed in the stacking direction. For example, the second coil conductor pattern may be located closest to the first main surface VS1, and the first coil conductor pattern may be located closest to the second main surface VS2.

In addition, a circuit configuration provided on the multilayer resin substrate is not limited to the configuration described in each of the above preferred embodiments, and is able to be appropriately changed within the scope of the functions and advantageous effects of the preferred embodiments of the present invention. In a circuit provided on the multilayer resin substrate, a capacitor defined by the conductor pattern or a frequency filter such as various filters (a low-pass filter, a high-pass filter, a band-pass filter, a band-elimination filter), for example, may be provided. Moreover, various transmission lines (a strip line, a microstrip line, a coplanar line, and the like) may be provided on the multilayer resin substrate. Furthermore, various electronic components such as chip components, for example, may be mounted on or embedded in the multilayer resin substrate.

It is to be noted that the planar shape, position, and number of first coil conductor patterns, second coil conductor patterns, and external electrodes are not limited to the configuration described in each of the above preferred embodiments and are able to be appropriately changed within the scope of the functions and advantageous effects of the preferred embodiments of the present invention. In addition, the planar shape of the external electrode may be a polygonal shape, a circular shape, an elliptical shape, an arc shape, a ring shape, an L shape, a U shape, a T shape, a Y shape, a crank shape, or a suitable shape, for example. Moreover, the external electrode may be provided only on the second main surface VS2 or may be provided both near the first main surface VS1 (or on the first main surface VS1) and near the second main surface VS2 (or on the second main surface VS2). Furthermore, the multilayer resin substrate may include a dummy electrode that is not connected to a circuit.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer resin substrate comprising:
- a stacked body including a plurality of resin layers stacked on each other; and
- a coil including a plurality of coil conductor patterns on two or more resin layers, respectively, among the plurality of resin layers, and including a winding axis in a stacking direction of the plurality of resin layers; wherein
- the plurality of coil conductor patterns include a first coil conductor pattern and a second coil conductor pattern alternately disposed in the stacking direction;
- the first coil conductor pattern includes:
  - a first overlapping portion overlapping with an adjacent second coil conductor pattern, when viewed in the stacking direction; and
  - a first non-overlapping portion not overlapping with the adjacent second coil conductor pattern;
- the second coil conductor pattern includes:
  - a second overlapping portion overlapping with an adjacent first coil conductor pattern, when viewed in the stacking direction; and
  - a second non-overlapping portion not overlapping with the adjacent first coil conductor pattern;
- the first non-overlapping portion protrudes more to an outer peripheral side in a radial direction of the plurality of coil conductor patterns than the adjacent second coil conductor pattern;
- the second non-overlapping portion protrudes more to an inner peripheral side in the radial direction than the adjacent first coil conductor pattern;
- the first coil conductor pattern and the second coil conductor pattern are alternately disposed in the stacking direction on three or more resin layers, respectively, among the plurality of resin layers;
- the first coil conductor pattern does not protrude to the inner peripheral side from any portion of the first coil conductor pattern overlapping with the adjacent second coil conductor pattern, when viewed in the stacking direction;
- the second coil conductor pattern does not protrude to the outer peripheral side from any portion of the second coil conductor pattern overlapping with the adjacent first coil conductor pattern, when viewed in the stacking direction;
- a width of the first non-overlapping portion in the radial direction is less than a width of the first overlapping portion in the radial direction; and
- a width of the second non-overlapping portion in the radial direction is less than a width of the second overlapping portion in the radial direction.

2. The multilayer resin substrate according to claim 1, further comprising:
- an external electrode on the stacked body; wherein
- either one of the first coil conductor pattern and the second coil conductor pattern that are located closest to the external electrode in the stacking direction includes:
  - an electrode overlapping portion overlapping with the external electrode, when viewed in the stacking direction; and
  - an electrode non-overlapping portion not overlapping with the external electrode; and
- the electrode non-overlapping portion is curved so as to be closer to the external electrode than the electrode overlapping portion.

3. The multilayer resin substrate according to claim 1, wherein the plurality of coil conductor patterns each have a spiral shape including two or more turns.

4. The multilayer resin substrate according to claim 1, wherein
- the first non-overlapping portion protrudes more only to the outer peripheral side in the radial direction than the adjacent second coil conductor pattern; and
- the second non-overlapping portion protrudes more only to the inner peripheral side in the radial direction than the adjacent first coil conductor pattern.

5. The multilayer resin substrate according to claim 1, wherein
- the first coil conductor pattern is a loop-shaped conductor pattern; and
- the second coil conductor pattern is a loop-shaped conductor pattern.

6. The multilayer resin substrate according to claim 1, wherein each of the plurality of resin layers includes a liquid crystal polymer or a polyether ether ketone as a main material.

7. The multilayer resin substrate according to claim 1, wherein the first coil conductor pattern has a rectangular or substantially rectangular loop shape.

8. The multilayer resin substrate according to claim 1, wherein the first coil conductor pattern is a Cu foil.

9. The multilayer resin substrate according to claim 1, wherein the second coil conductor pattern has a rectangular or substantially rectangular loop shape.

10. The multilayer resin substrate according to claim 1, wherein the second coil conductor pattern is a Cu foil.

* * * * *